April 2, 1935.  H. KETEL  1,996,425
FIFTH WHEEL FOR TRAILERS
Filed June 20, 1932  2 Sheets-Sheet 1
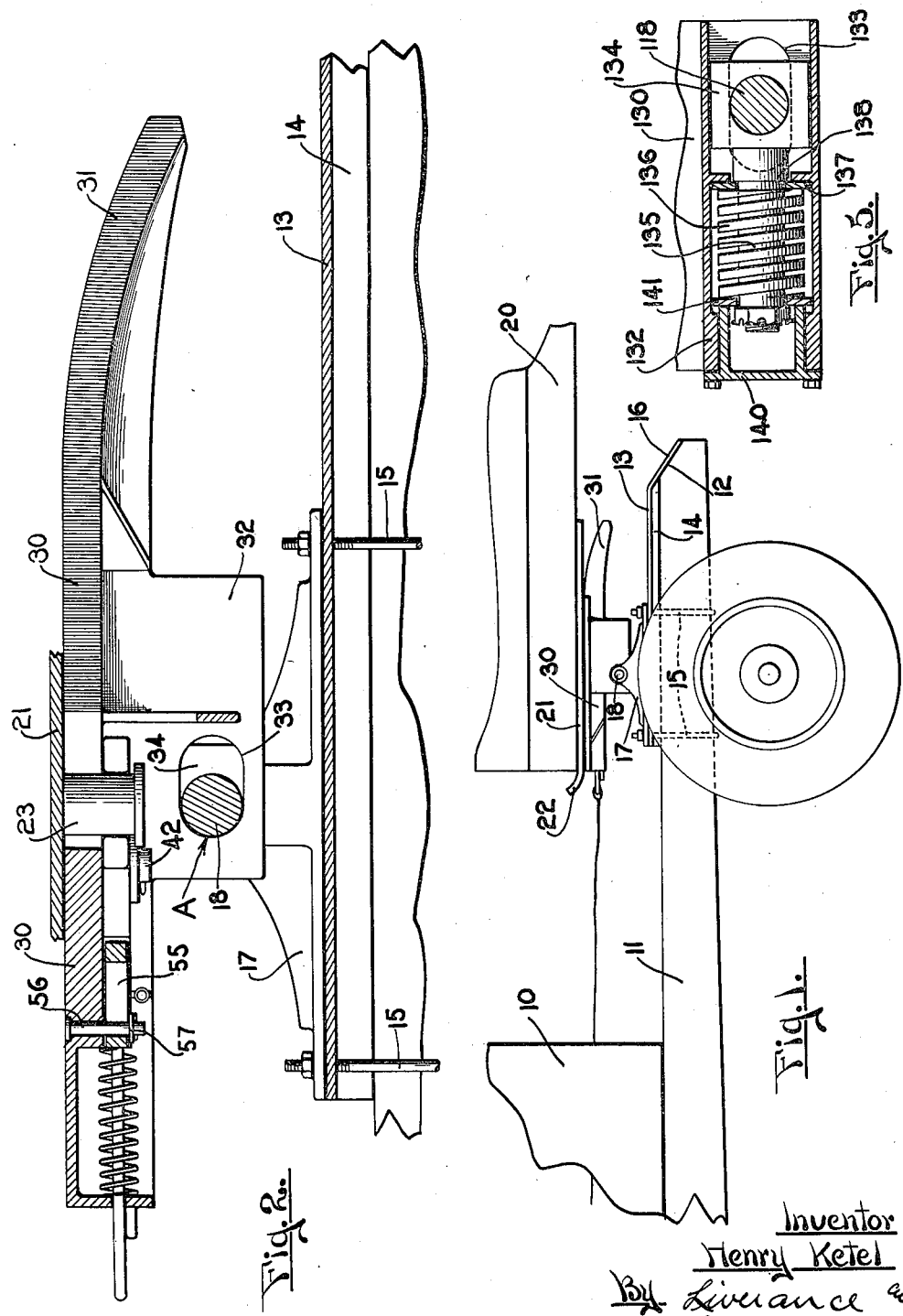
Inventor
Henry Ketel April 2, 1935.  H. KETEL  1,996,425
FIFTH WHEEL FOR TRAILERS
Filed June 20, 1932  2 Sheets-Sheet 2
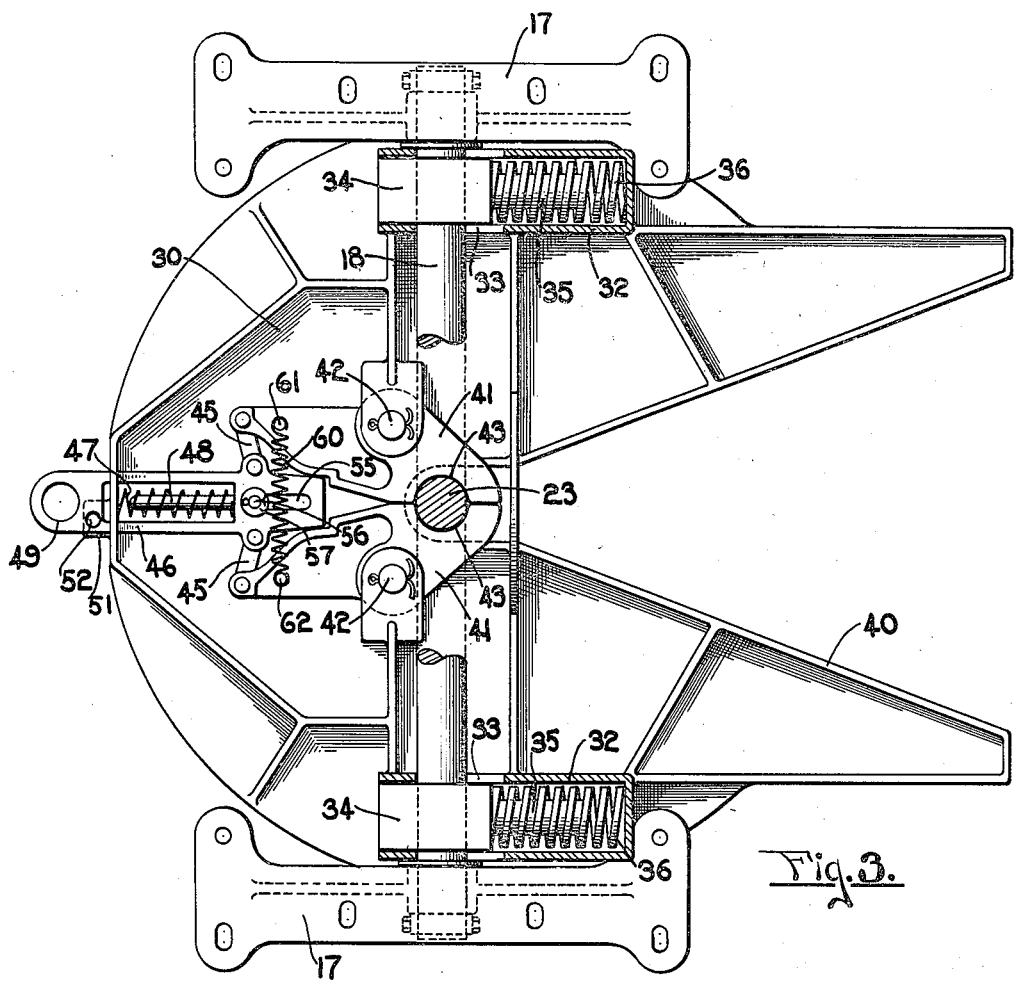
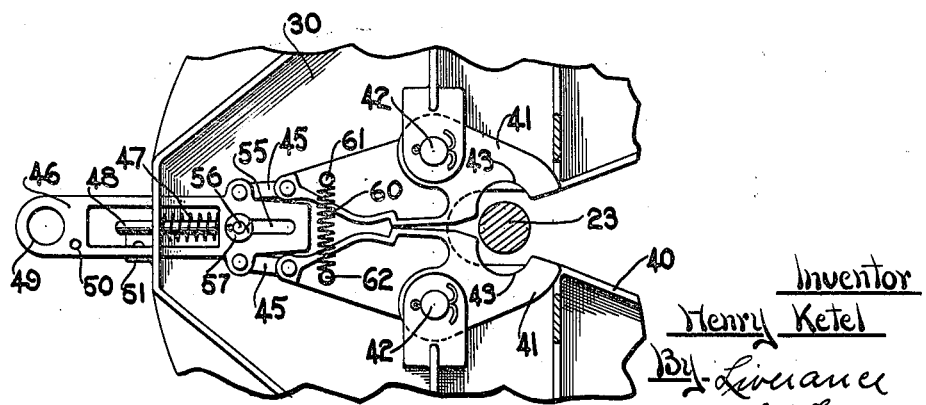

Patented Apr. 2, 1935

1,996,425

UNITED STATES PATENT OFFICE 1,996,425

FIFTH WHEEL FOR TRAILERS

Henry Ketel, Holland, Mich., assignor to West Michigan Steel Foundry Co., Muskegon, Mich., a corporation of Michigan Application June 20, 1932, Serial No. 618,132

3 Claims. (Cl. 280—33.1)

This invention relates generally to a coupling device and more particularly to a fifth wheel adapted to be inserted between a pulling unit, as, for instance, a truck and a pulled unit, as, for instance, a trailer or a semi-trailer.

Considerable difficulty is had in obtaining the proper connection between units of this character inasmuch as a certain amount of yielding is necessary in order that the units may have limited movement with respect to each other and yet be securely connected together.

It is the aim of my invention to produce a coupling unit which will not only admirably serve in its coupling functions but one which is simple in its operation and furthermore is economical to manufacture.

One feature of my invention lies in my novel toggle means for locking the jaws, such acting in conjunction with the king pin of the trailer, in either locked or unlocked position. Hand in hand with the toggle mechanism is spring mechanism, such spring mechanism consisting of two springs, these springs being so arranged that both of them tend to maintain the jaws in closed position while only one spring tends to keep the jaws in open position, the other spring being so positioned as to exert no substantial force on the jaws.

Another feature of my invention lies in the lost motion connection between the truck and its trailer, this lost motion connection being yieldable to permit the trailer to slightly overrun the truck, spring means normally preventing such action.

Another feature is the positive locking means which I provide for maintaining the latching or locking jaws in closed position.

Still another feature is the curved rear upper surface of the lower fifth wheel plate together with the cutaway portion on the sills of the truck, such surfaces forming a relatively long surface against which the fifth wheel plate, located on the underside of the trailer, rides and cams upwardly as the two units are brought toward attaching position.

Further objects and advantages will be apparent from the following description.

In the drawings:—

Fig. 1 is a side view of a truck and its trailer, my improved coupling mechanism being located therebetween.

Fig. 2 is an enlarged side view, parts being broken away, showing my coupler in locked position.

Fig. 3 is an underplan view of my device, parts being broken away in order to better show the invention, the locking jaws being shown in closed and locked position.

Fig. 4 is likewise an under plan view, this view showing the locking jaws in open position.

Fig. 5 is a modified form of the coupling between the cross shaft of the truck and the lower plate of the fifth wheel.

Similar numerals refer to similar parts throughout the several views.

The reference numeral 10 designates a tractor, having sills 11, and 20, indicates the trailer, shown in the drawings in the form of what is generally termed a "semi-trailer", due to the fact that no wheels are provided at the front end of the trailer body.

While this invention is illustrated in connection with a semi-trailer, it is to be understood that it may be as readily used in connection with a trailer having a wheel or wheels at its front end in addition to those shown at the rear.

Referring particularly to Figs. 1 and 2, it will be seen that the sills 11 are cut away as at 12, a plate 13 resting upon the wooden bumper block 14, being held in place by the U-bolts 15 extending around the sills 11, the metal plate 13 being sloped rearwardly over the cut away portion 12 to form an inclined surface 16.

Bracket members 17, one on each side of the truck, also are held in place by the U-bolts 15, see Fig. 2, and a shaft 18 extends therebetween as is clearly shown in Fig. 3.

The trailer 20 has a fifth wheel plate 21 fastened to its lower side, see Fig. 1, this plate being curved upwardly as at 22 whereby it may ride upwardly over the sloped surface 16 to aid in coupling the units together. The plate 21 has a depending king pin 23.

A lower fifth wheel plate 30, having a downwardly curved rear portion 31, has integrally formed box members 32 at either side thereof, these box members being slotted as at 33 to receive the cross shaft 18. The cross shaft 18 has blocks 34 with guide pins 35 extending therefrom, the blocks 34 snugly riding in the recesses of the box members 32 and the guide pins 35 also being located therein. Coil springs 36, see Fig. 3, surround the guide pins 35 and hence a lost motion connection is formed between the cast plate 30 and the pulling shaft 18, the springs 36 tending to render this lost motion connection inoperative.

The operation of the above connection is as follows. The king pin 23, rigid with the trailer 20, is rigidly attached to the plate member 30 and the resistance of the trailer to forward motion is transmitted between the front side of the slots 33 and the front portion of the shaft 18, that is, referring to Fig. 2, the pressure occurs as indicated by the arrow A. Whenever the trailer, for any reason whatsoever, tends to overrun the truck, the casting 30 tends to move forward and the springs 36 are compressed due to the forward movement of the spring boxes 32, the front end of the springs abutting against the blocks 34, such blocks being held rigid with the truck.

The means for connecting the king pin 23 onto the plate 30 will now be set forth. The plate 30, has an opening 40, clearly shown in Fig. 3, this opening being tapered and guiding the king pin 23 to its apex whenever the trailer is brought towards the coupling position. Jaw members 41 are pivoted at 42 intermediate their ends, one end of the jaw members being located adjacent the apex of the opening 40 and being semi-circularly recessed as at 43 to receive the king pin 23.

The other ends of the jaw members 41 have links 45 pivoted thereto, these links also being pivoted onto the locking element 46 as is clearly shown in Figs. 3 and 4. This locking element 46 is slidably mounted in a depending flange on the lower fifth wheel plate 30 and is recessed to receive the coil spring 47, this spring encircling the pin 48 which is rigid with the sliding element 46. The pin 48 likewise slides through an opening in the depending flange and hence the tendency of this spring is to force the sliding locked element into its locking position as is shown in Fig. 3. The locking element 46 has an opening 49 in which a flexible element may be attached to hold or exert tension upon the element 46 to prevent its moving to locking position or to withdraw it from its locking position. The sliding element 46 also has a small opening 50 which is adapted to aline with an opening in the boss 51 on the casting member 30 when the several parts are in locked position whereby a pin 52, see Fig. 3, may be inserted therein, thus absolutely holding the several members in locked position.

The locking element 46 is slotted as indicated at 55 and a pin 56, depending from the plate 30, see Fig. 2, extends therethrough and thus permits proper sliding movement of the slide 46 but prevents side movement thereof and hence the jaws are always equally operated. A washer 57 supports the slide 46 from downward movement.

A spring member 60 is fastened at 61 and 62 between the jaw members and the tendency of this spring is to maintain the jaw members in open position as shown in Fig. 4. Also, the heavy spring 47 acts against the slide 46 which in turn pushes the links 45. As the axes of these links, prolonged, pass between the pivots of the jaws, the tendency of the spring 47 is likewise to hold the jaws in their open position.

The several parts, when in the position shown in Fig. 4, are in open position and the addition of the trailer, the curved end 22 of the plate 21 sliding upwardly along the surfaces 16 and 31, causes the king pin 23 to enter the opening 40 and abut against the inner edges of recesses 43 thereby turning the jaws 41 to closed position, the spring 47 tending to assist in this operation after the initial movement and the spring 60 first opposing this action and then, after the parts are as shown in Fig. 3, also tending to assist and hold the several parts in locked position. The tapered end of the member 46 slides between the ends of the jaws 41, see Fig. 3, and absolutely prevents any separation thereof.

Referring now to Fig. 5, 118 indicates the cross shaft of the truck, such being revolubly mounted in bracket members. Numeral 130 is the lower fifth wheel plate, such having boxes or housings 132, only one being shown. The boxes 132 are slotted as at 133. A block 134 encircles the shaft 118 and rides in the housing, its position being normally midway of the slot.

A pin 135 is attached to the block and a spring 136 encircles the same, one end of the spring bearing against a washer 137 which abuts against an integral flange of the box 132. A shoulder 138 on the guide pin 135 limits the movement of the washer 137 as clearly shown in Fig. 5.

The other end of the spring 136 abuts against the plug 140 and a second washer 141 slidably receives the guide pin 135, a nut preventing separation thereof.

As will be readily understood the lost motion connection permits yielding movement in either direction and yet only a single spring is required, thus giving a compact assembly.

Having thus revealed this invention, I claim as new and desire to secure the following combination and elements, or equivalents thereof, by Letters Patent of the United States.

I claim:

1. A fifth wheel unit, comprising, a fifth wheel portion and a bolster plate portion located therein, a radial passage extending from the center to the periphery of said plate, latching means located adjacent the radial passage intermediate its ends to form a king pin receiving socket, means for maintaining the latching means in either operative or inoperative position, said last named means including two sets of spring means, both sets of spring means being effective to maintain the latching means in its latched position and one set of the spring means being effective to maintain the latching means in its open or inoperative position, and toggle means for moving the latching means into operative or inoperative position.

2. The combination with a tractor and a trailer, of a fifth wheel plate mounted on the tractor, having a pair of coupler jaws pivoted thereon to swing horizontally, a fifth wheel plate mounted on the under side of the trailer, and having a post depending therefrom, said post being adapted to come into engagement with said jaws, and means for locking the jaws around the said post, said means comprising a plunger adapted to engage between the jaws and hold them locked until the plunger is withdrawn, a link pivoted at one end onto one jaw and at its other end onto the said plunger, a second link pivoted onto the plunger and the other jaw, said links forming a toggle which passes its dead center during the movement of the plunger from its operative to its inoperative position, or vice versa, and spring means extending between the jaws, said spring means tending to move the toggle from its dead center position for the purpose described.

3. The combination of a fifth wheel plate for a tractor vehicle, said plate having a pair of pivoted coupler jaws adjacent its center, a fifth wheel plate for a trailer vehicle, one of said plates being tiltably mounted, a post on the trailer plate to be engaged by the jaws, guiding means to direct the post to the jaws upon movement of the trailer fifth wheel plate toward the tractor fifth wheel plate, both of said plates having plate surfaces adapted to contact with each other, said coupler jaws being adapted to receive and automatically engage and lock the post in rotatable but non-sliding position, toggle means for moving the jaws to either closed or open positions and spring means cooperably associated with said toggle means for pushing the same past their dead center position to move the jaws to their closed position.

HENRY KETEL.